United States Patent
Bae (10) Patent No.: US 7,760,809 B2
(45) Date of Patent: Jul. 20, 2010

(54) DEBLOCKING FILTER APPARATUS AND METHODS USING SUB-MACRO-BLOCK-SHIFTING REGISTER ARRAYS

(75) Inventor: Jong-Woo Bae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1454 days.

(21) Appl. No.: 11/140,324

(22) Filed: May 27, 2005

(65) Prior Publication Data

US 2006/0002477 A1    Jan. 5, 2006

(30) Foreign Application Priority Data

Jul. 2, 2004    (KR)    ............ 10-2004-0051641

(51) Int. Cl.
*H04N 7/12*    (2006.01)
(52) U.S. Cl. ............... 375/240.29; 375/240.27
(58) Field of Classification Search .......... 375/240.29, 375/240.27
See application file for complete search history.

(56) References Cited

U.S. PATENT DOCUMENTS

| 6,882,688 | B1 | 4/2005 | Oohashi et al. |
| 7,084,929 | B2 * | 8/2006 | Lange et al. ............ 348/716 |
| 7,551,322 | B2 * | 6/2009 | Reese ............ 358/2.1 |
| 2002/0051496 | A1 * | 5/2002 | Hashimoto ............ 375/240.27 |
| 2003/0099292 | A1 | 5/2003 | Wang et al. |
| 2003/0099294 | A1 | 5/2003 | Wang et al. |
| 2004/0017515 | A1 | 1/2004 | Lange et al. |
| 2004/0057624 | A1 | 3/2004 | Wells |
| 2004/0228415 | A1 * | 11/2004 | Wang ............ 375/240.29 |

FOREIGN PATENT DOCUMENTS

| JP | 2002-064820 | 2/2002 |
| KR | 1020020014711 A | 2/2002 |
| KR | 1020030056455 A | 7/2003 |

* cited by examiner

*Primary Examiner*—Gims S Philippe
(74) *Attorney, Agent, or Firm*—Myers Bigel Sibley & Sajovec, PA (57) ABSTRACT

A register array of a deblocking filter includes a first register configured to store an amount of image data corresponding to a sub-macro block of a macro block to be filtered, a second register configured to store an amount of image data corresponding to a portion of a sub-macro block adjacent a first edge of the macro block to be filtered, and a third register configured to store an amount of image data corresponding to an entire sub-macro block adjacent a second edge of the macro block to be filtered. The first, second and third registers are further configured to support sequential horizontal and vertical component filtering of portions of sub-macro blocks of the macro block to be filtered by sequentially shifting portions of the sub-macro blocks through the first, second and third registers.

14 Claims, 13 Drawing Sheets

DEBLOCKING FILTER APPARATUS AND METHODS USING SUB-MACRO-BLOCK-SHIFTING REGISTER ARRAYS

CROSS-REFERENCE TO RELATED APPLICATIONS

This U.S. non-provisional patent application claims priority under 35 U.S.C. §119 of Korean Patent Application 2004-51641 filed on Jul. 2, 2004, the entire contents of which are hereby incorporated by reference.

BACKGROUND OF THE INVENTION

The present invention relates to image processing apparatus, methods and computer program products and, more particularly, to deblocking filter apparatus, methods and computer program products.

Many image processing systems use image data compressed by Standard Video Codec. In general, a video codec may use H.261, H.262, and H.263 recommended by the International Telecommunication Union (ITU) and codec standards of MPEG-1, MPEG-2, MPEG-3, and MPEG-4 recommended by the Motion Picture Experts Group (MPEG). Research and standardizing work for a H.264 video codec capable of embodying higher compression rates is currently in progress.

Figure 1:
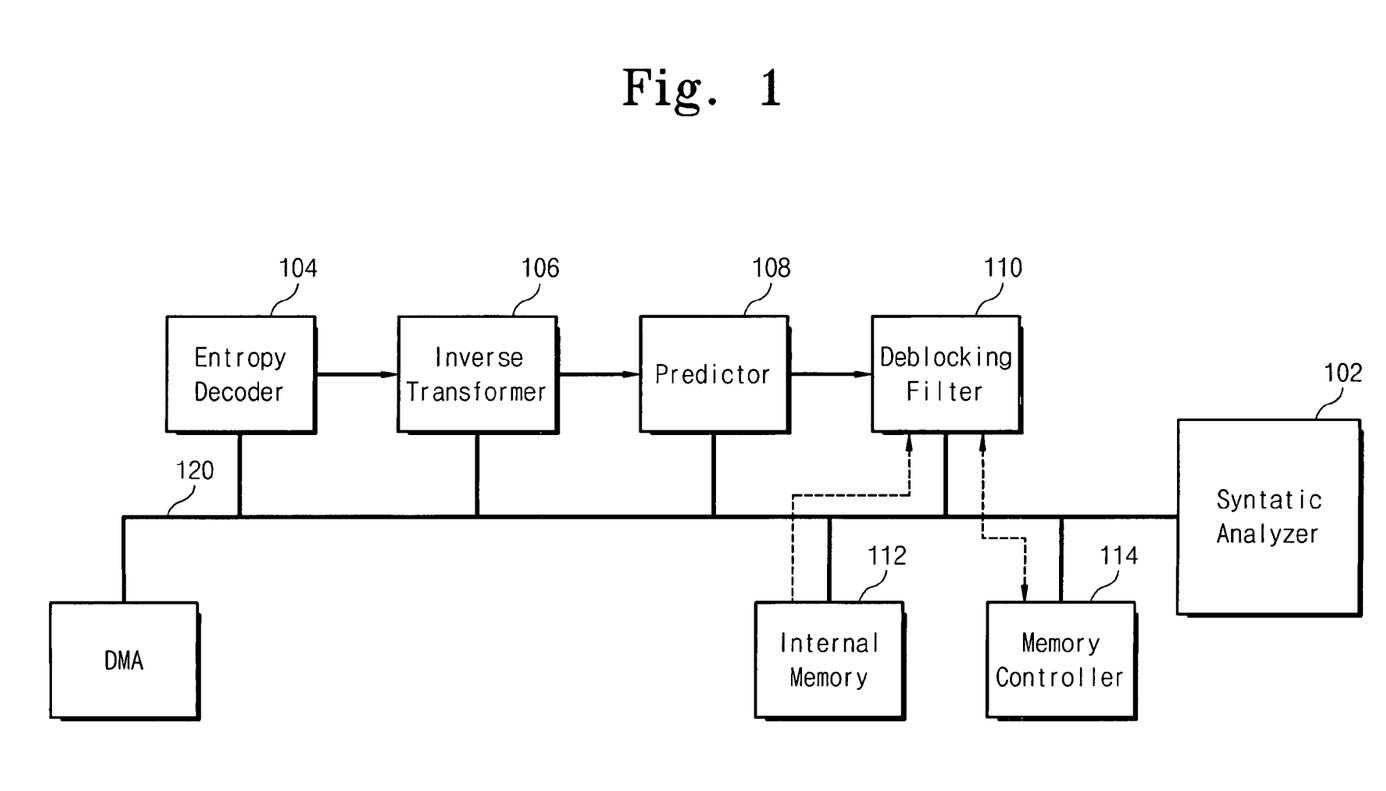
FIG. 1 is a block diagram showing a conventional video decoder system.

In a conventional video decoder system shown in FIG. 1, encoded image data are restored to original data through a decoding procedure in an image processor and are displayed on a screen. Referring to FIG. 1, the conventional video decoder system includes a syntactic analyzer 102, a plurality of hardware modules 104, 106, 108, and 110 for decoding encoded image data, a memory 712, and peripheral devices DMA. These components exchange data transmission through a bus 120. As examples of the hardware modules, there is shown an entropy decoder 104, an inverse transformer 106, a predictor 108, and a deblocking filter 110. The encoded image data are sequentially processed by respective hardware modules and restored to original data. During a decoding procedure, corresponding modules access and read out data from an internal memory 112, such as an external memory or an SRAM, or store processed data therein.

Image data is compressed in macro blocks. When image data is restored to original data, a blocking effect may occur that produces different screens in macro blocks at boundaries between blocks of restored image data due to discontinuity of a slope or an image data value. The blocking effect appears as a square lattice along boundaries between blocks that can be easily sensed, causing a deterioration of subjective image quality. The deblocking filter 110 functions to reduce the blocking effect.

Figure 2:
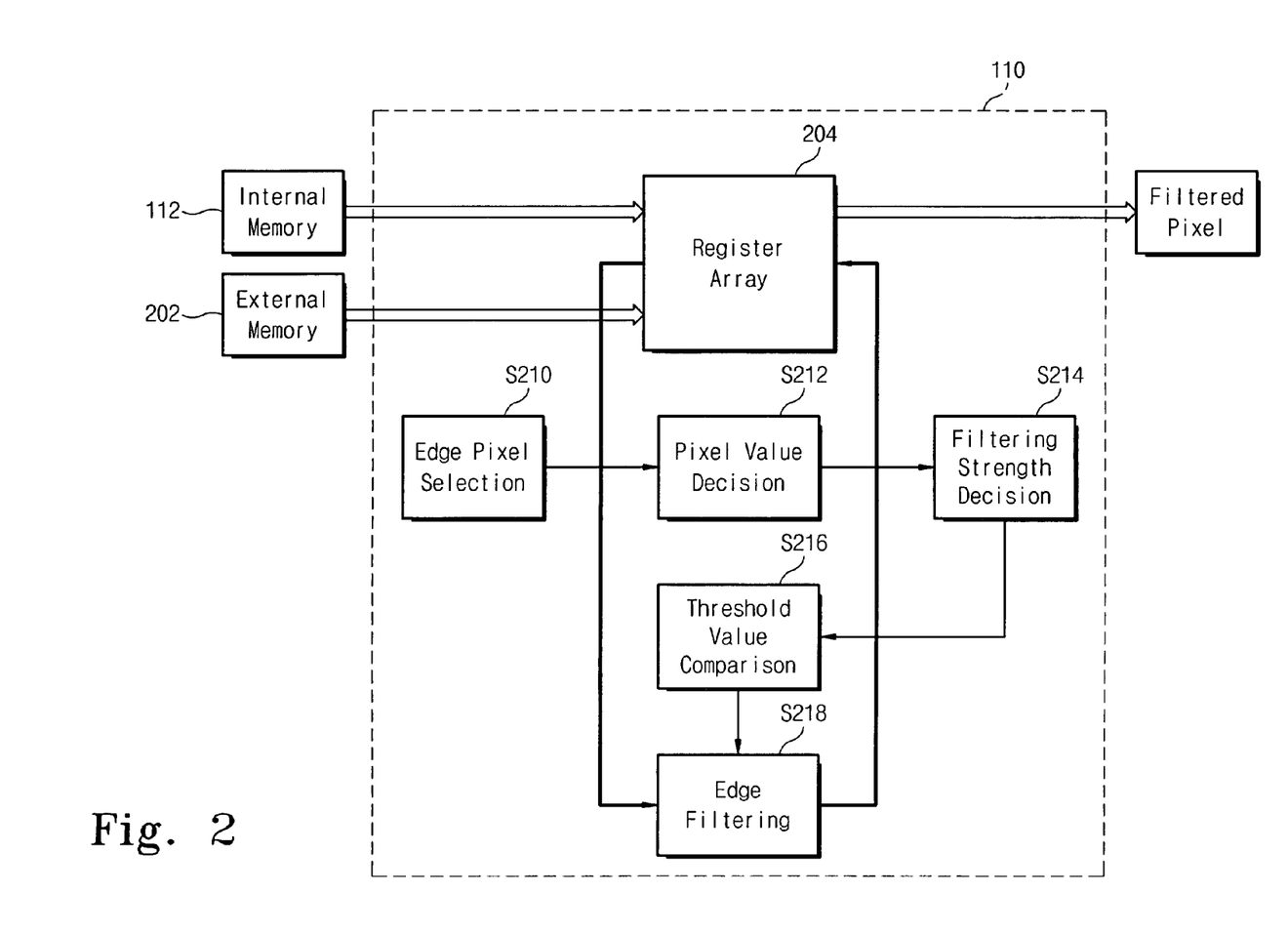
FIG. 2 is a block diagram that illustrates an operation of a conventional deblocking filter.

FIG. 2 is a block diagram that illustrates an operation of a deblocking filter 110. The deblocking filter 110 selects edges in which a filtering operation is to be performed (step S210), reads pixel data of a corresponding edge from the external memory 200 or an internal memory 112, and stores the read pixel data in a register array 204 of the deblocking filter 110 (step S212). The deblocking filter 110 keeps an edge part of a real image, and decides a filtering strength of a boundary filter to prevent excessive filtering (step S214). The deblocking filter 110 compares the filtering strength of a boundary filter with a threshold value, and finally judges whether or not a filtering operation is performed according to the compared result (step S216). When the filtering operation is performed, the deblocking filter 110 performs the filtering operation using pixel data of a corresponding edge stored in a register array 204 (step S218). Pixels from the filtering operation are output to an external recipient. An algorithm for such a deblocking procedure is described in H.264/AVC standards.

Figure 3:
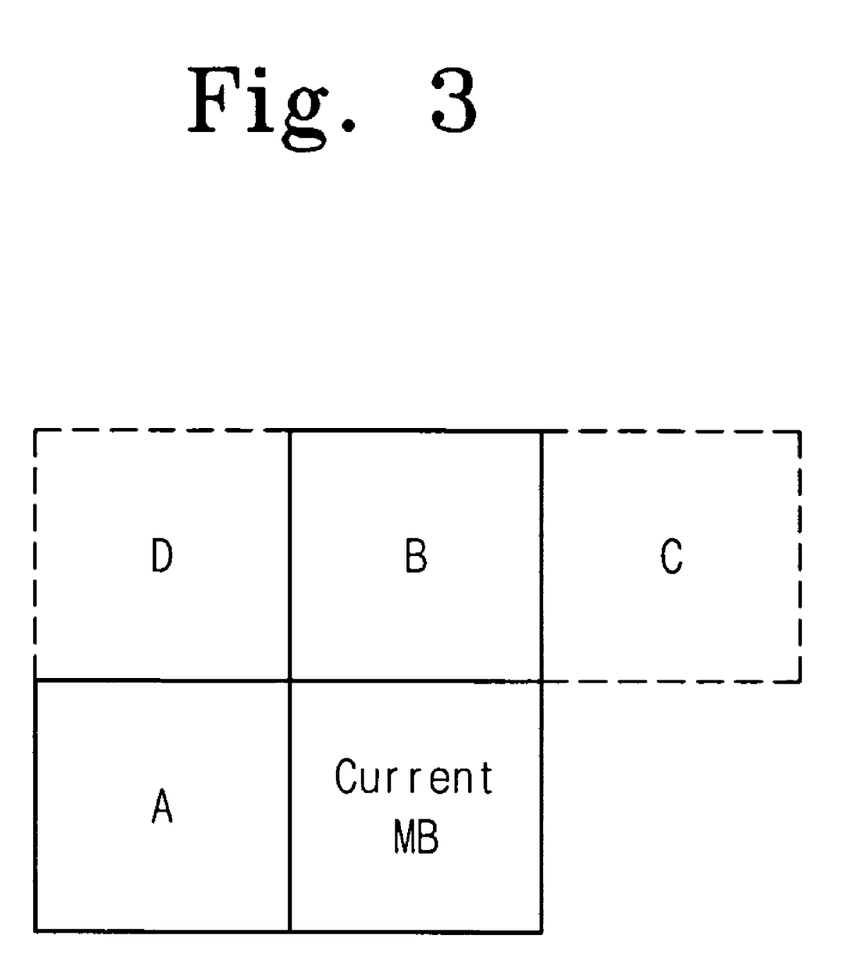
FIG. 3 is a view for illustrating a conventional filtering operation for one macro block.

Because compression of image data in macro blocks can cause the blocking effect, an edge filtering in the deblocking filter may also be performed in macro blocks. FIG. 3 is a view that illustrates a filtering operation for one macro block. Referring to FIG. 3, a filtering operation for a current macro block is carried out based on a macro block A positioned at the left of the current macro block (MB) and a macro block B positioned above the current macro block. For an edge filtering of the current macro block, data for the macro block A and data for the macro block B are used.

Figure 4A:
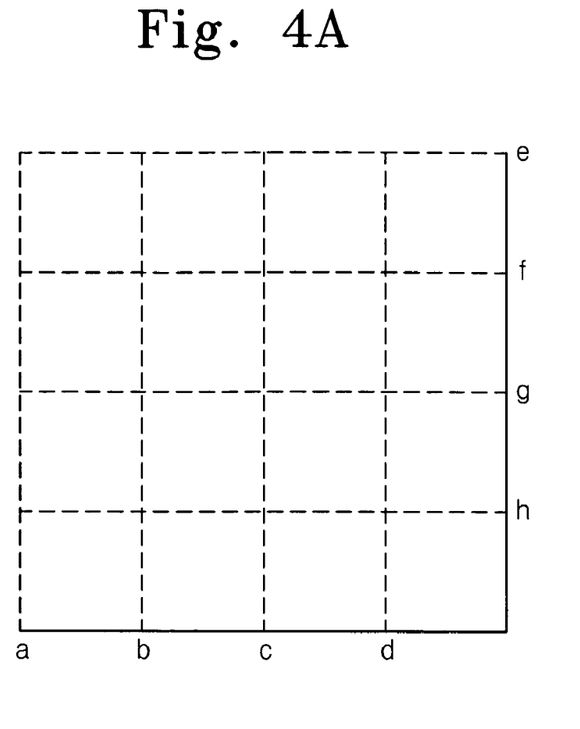
FIG. 4A is a view showing a conventional filtering operation sequence of a luminance component for one macro block.
Figure 4B:
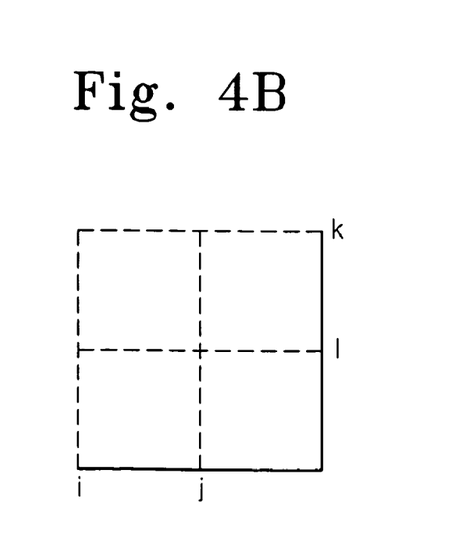
FIG. 4B is a view showing a conventional filtering operation sequence of a chroma component for one macro block.

Filtering operations for both a luminance component and a chroma component of pixels may be performed. FIG. 4A is a view showing a filtering operation sequence of a luminance component for one macro block. FIG. 4B is a view showing a filtering operation sequence of a chroma component for one macro block.

A macro block typically includes a 16×16 block of pixels. As shown in FIG. 4A, in a filtering operation of a luminance component for one macro block, filtering operations for 4 vertical boundaries and 4 horizontal boundaries are sequentially performed. Namely, a filtering operation of a luminance component is carried out in the order of a, b, c, d, e, f, g, and h. As shown in FIG. 4B, in a filtering operation of a chroma component for one macro block, a filtering operation for vertical boundaries i and j, and horizontal boundaries k and l are sequentially performed in a two-by-two manner. In general, after a filtering operation for a luminance component is performed, a filtering operation for a chroma component is carried out.

Figure 5:
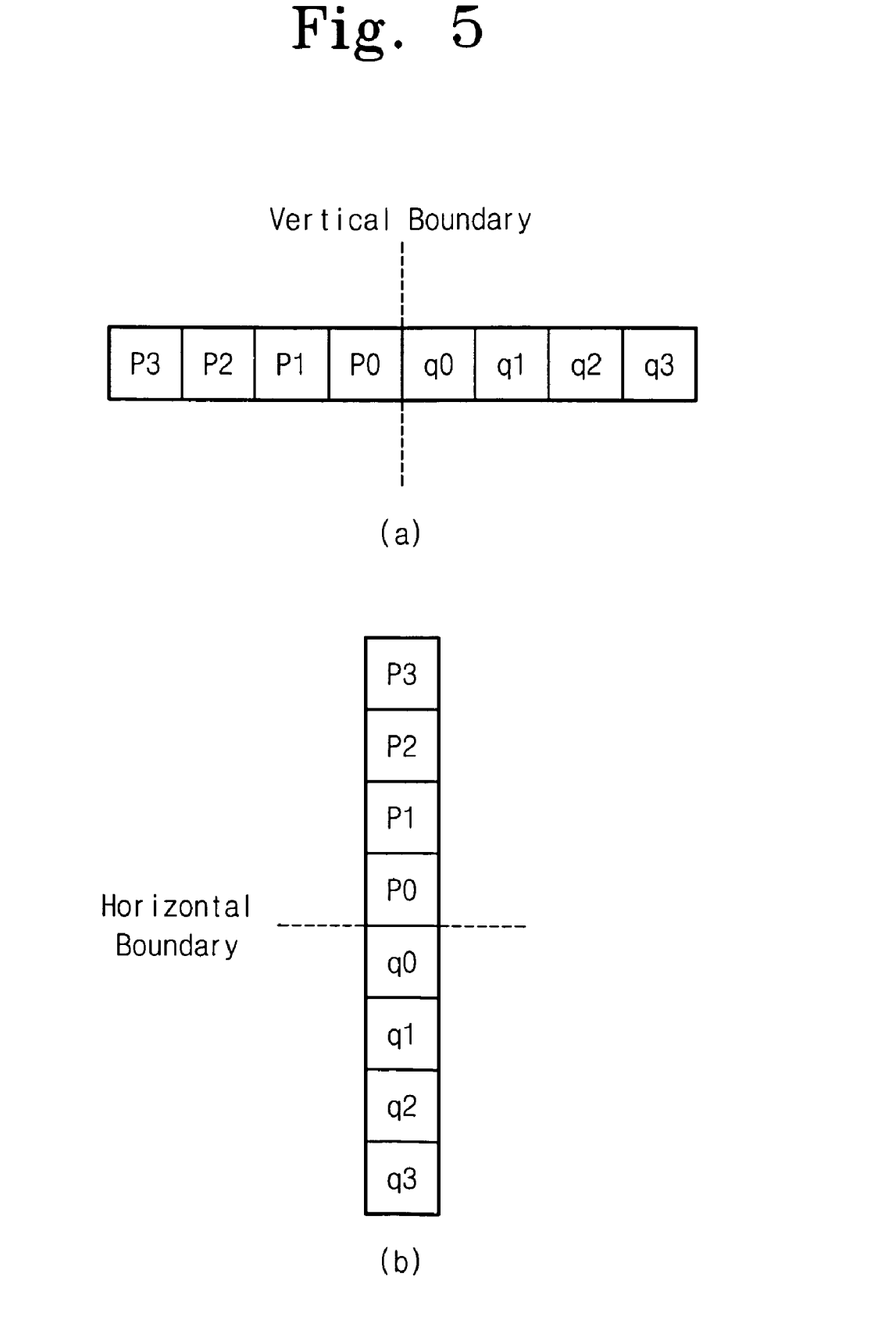
FIG. 5A is a view showing pixels used when one filtering operation for one vertical boundary is performed.
FIG. 5B is a view showing pixels used when one filtering operation for one horizontal boundary is performed.

FIG. 5A is a view showing pixels used when one filtering operation for one vertical boundary is performed. FIG. 5B is a view showing pixels used when one filtering operation for one horizontal boundary is performed. As shown in FIGS. 5A and 5B, a filtering operation for one vertical boundary is performed over four pixels left and right. In the same manner, a filtering operation for one horizontal boundary is performed over four pixels up and down.

During a conventional filtering operation, particularly, when a filtering operation of a vertical component for a horizontal boundary is performed, because eight up-and-down pixels are accessed and the operation performed thereon, eight memory accesses may be required for each filtering operation. In order to perform the filtering operation of a vertical component for one macro block, a total of 768 cycles may be required. Thus, a time delay may occur in a filtering operation for image data having high quality. As a result, real-time processing of image data of high quality may be difficult.

SUMMARY OF THE INVENTION

According to some embodiments of the present invention, a register array of a deblocking filter includes a first register configured to store an amount of image data corresponding to a sub-macro block of a macro block to be filtered, a second register configured to store an amount of image data corresponding to a portion of a sub-macro block adjacent a first edge of the macro block to be filtered, and a third register configured to store an amount of image data corresponding to an entire sub-macro block adjacent a second edge of the macro block to be filtered. The first, second and third registers are further configured to support sequential horizontal and vertical component filtering of portions of sub-macro blocks of the macro block to be filtered by sequentially shifting portions of the sub-macro blocks through the first, second and third registers.

In some embodiments, the first and second registers are configured to support sequential horizontal component filtering operations on portions of the sub-macro blocks by circularly shifting the portions of the sub-macro blocks through the first and second registers. The sequential horizontal component filtering operations may comprise sequential filtering operations on combinations of data in the second register and data in a portion of the first register. In further embodiments, the first and third registers are configured to support concurrent vertical component filtering operations on multiple ones of the portions of the sub-macro blocks. The first, second and third registers may be configured to receive image data from an internal memory of the deblocking filter.

In certain embodiments of the present invention, the first and third registers are 16×4 registers, and the second register is a 4×4 register. The sub-macro blocks may be 16×4 sub-macro blocks, and the portions of the sub-macro blocks may be 4×4 portions of the 16×4 sub-macro blocks.

In some method embodiments of the present invention, a deblocking filtering method comprises providing a first register configured to store an amount of image data corresponding to a sub-macro block of a macro block to be filtered, a second register configured to store an amount of image data corresponding to a portion of a sub-macro block adjacent a second edge of the macro block to be filtered, and a third register configured to store an amount of image data corresponding to an entire sub-macro block adjacent a first edge of the macro block to be filtered. The method further includes sequentially horizontal and vertical component filtering portions of sub-macro blocks of the macro block to be filtered by sequentially shifting portions of the sub-macro blocks through the first, second and third registers.

In some embodiments, sequentially horizontal and vertical component filtering portions of sub-macro blocks of the macro block to be filtered by sequentially shifting portions of the sub-macro blocks through the first, second and third registers comprises sequentially horizontal component filtering portions of the sub-macro blocks by circularly shifting the portions of the sub-macro blocks through the first and second registers and concurrently vertical component filtering the horizontal component filtered portions of the sub-macro blocks using the first and third registers. The sequentially horizontal component filtering may include sequentially filtering combinations of data in the third register and data in a portion of the first register. The first and third registers may be 16×4 registers, and the second register may be a 4×4 register. The sub-macro blocks may be 16×4 sub-macro blocks, and the portions of the sub-macro blocks may be 4×4 portions of the 16×4 sub-macro blocks.

In additional embodiments of the present invention, a deblocking filtering method includes dividing a macro block of image data into a plurality of equal-sized sub-macro blocks, and performing the following operations on each of the sub-macro blocks in sequence: performing a horizontal component filtering operation on the sub-macro block; and then performing a vertical component filtering operation on the horizontal component filtered sub-macro block. For example, the plurality of equal-sized sub-macro blocks may include four 16×4 sub-macro blocks, and performing the following operations on each of the sub-macro blocks in sequence comprises: performing a horizontal component filtering operation on a first sub-macro block; performing a vertical component filtering operation on the horizontal component filtered first sub-macro block; performing a horizontal component filtering operation on a second sub-macro block; performing a vertical component filtering operation on the horizontal component filtered second sub-macro block; performing a horizontal component filtering operation on a third sub-macro block; performing a vertical component filtering operation on the horizontal component filtered third sub-macro block; performing a horizontal component filtering operation on a fourth sub-macro block; and performing a vertical component filtering operation on the horizontal component filtered fourth sub-macro block. The first, second, third, and fourth sub-macro blocks may be positioned in the order from an uppermost edge of the macro block to a lowermost edge of the macro block.

Some embodiments of the present invention include a register array structure of a deblocking filter capable of reducing a filtering operation time of the deblocking filter. In some embodiments, a register array structure is provided that effectively reduces the time required to perform a filtering operation of a vertical component. In further embodiments, methods of operating such a register array structure are provided.

In some embodiments, a register array of a deblocking filter includes a register array include a first register for sequentially storing and outputting a plurality of sub-macro blocks having the same size divided from a current macro block to be filtered, a second register for storing adjacent data at the left of the sub-macro blocks stored in the first register, and a third register for storing adjacent data at upper ends of the sub-macro blocks stored in the first register. The third register firstly stores data of a macro block arranged at an upper end of the current macro block and then stores data of a sub-macro block output from the first register.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first item could be termed a second item, and similarly, a second item may be termed a first item without departing from the teachings of the present invention. As used herein, the term "and/or" includes any and all combinations of one or more of the associated listed items. The symbol "/" may also used as a shorthand notation for "and/or".

Figure 6:
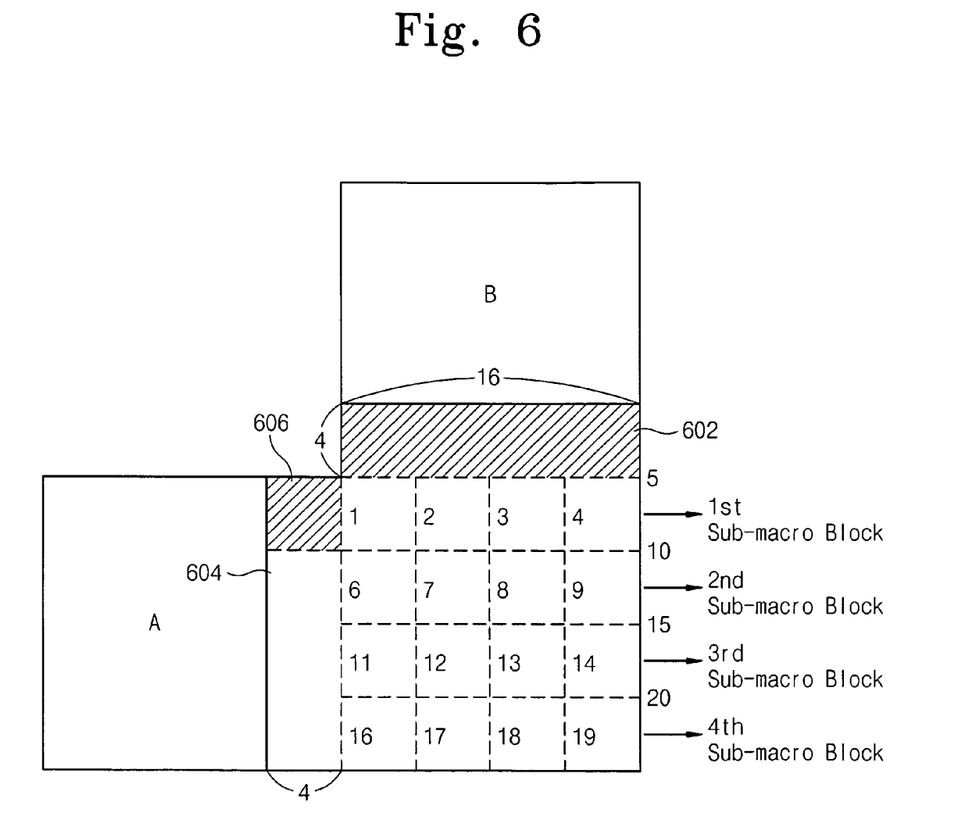
FIG. 6 is a view showing a filtering operation sequence for one macro block according to some embodiments of the present invention.

FIG. 6 is a view showing a filtering operation sequence for one macro block according to some embodiments of the present invention. Referring to FIG. 6, in filtering operations according to some embodiments of the present invention, a current macro block is divided into first through fourth sub-macro blocks, each having a size of, for example, 16×4. A horizontal component filtering operation for a first sub-macro block positioned at an upper-most portion is performed. After the horizontal component filtering operation for the first sub-macro block is terminated, a vertical component filtering operation for the first sub-macro block is carried out. In a similar manner, filtering operations are performed in the order for the second, the third, and fourth macro blocks. The filtering operation order is shown by the Arabic numerals 1-16.

Figure 7:
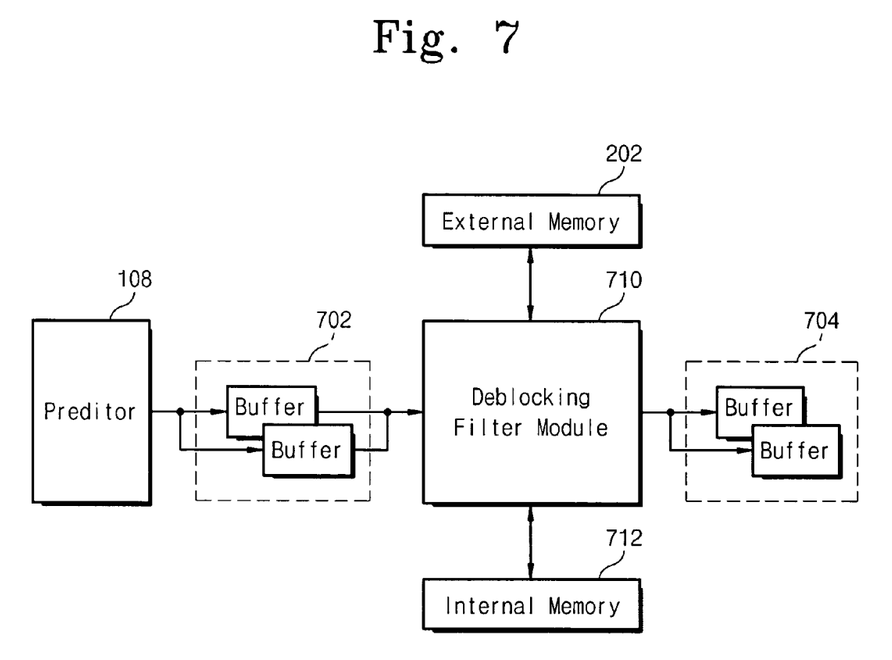
FIG. 7 is a block diagram that illustrates an operation of a deblocking filter according to a further embodiments of the present invention.

FIG. 7 is a block diagram that illustrates exemplary operations of a deblocking filter in a filtering process according to some embodiments of the present invention. With reference to FIGS. 6 and 7, a deblocking filter 710 of the present invention reads out luminance and chroma data of a current macro block from a dual buffer 702 storing prediction results, and stores the read data in an internal register array. The deblocking filter 710 fetches data of a left adjacent macro block A and an upper adjacent macro block B among macro blocks adjacent to the current macro block from an external memory 202, and stores the fetched data in an internal memory 712 and then in a register array of the deblocking filter 710.

As explained above with reference to FIG. 6, according to some embodiments of the present invention, a filtering operation is performed by dividing the current macro block into four sub-macro blocks. First, a first sub-macro block data of an upper end is stored in the register array. The deblocking filter 710 reads out 16×4 data 602 adjacent to the first sub-macro block in the upper adjacent macro block B from the external memory 202, and stores the read data in the internal memory 712 and then in the register array. The deblocking filter 710 stores 4×16 data from a left adjacent macro block A in the external memory 202, and stores data corresponding to 4×4 block 606 of an upper end from this data in the register array. Accordingly, 16×4 data 602 included in the macro block B and 4×16 data included in the macro block A are stored in the internal memory 712 of FIG. 7. The deblocking filter 710 performs a filtering operation on the data stored in the register array, and outputs macro block data through a dual buffer 704.

Figure 8:
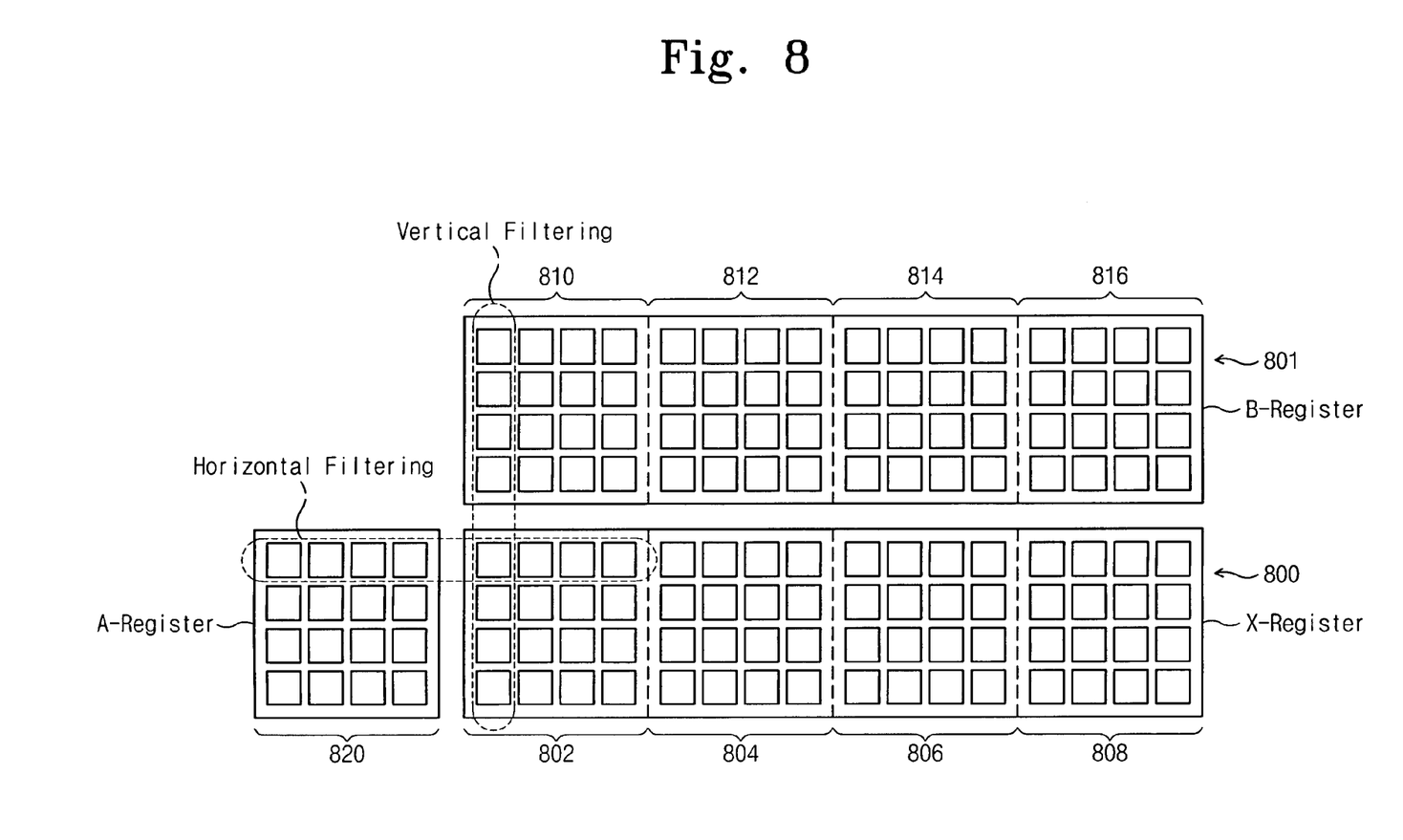
FIG. 8 illustrates a vertical component filtering operation and a horizontal component filtering operation in a register array according to some embodiments of the present invention.

FIG. 8 is a view illustrating a register array according to some embodiments of the invention, and illustrates a vertical and horizontal component filtering operations that may be performed in the register array according to further embodiments of the present invention. A filtering operation in sub-macro blocks according to some embodiments of the present invention will now be described with reference to FIGS. 6 and 8. The register array shown in FIG. 8 includes 16×4 X-register 800, 4×4 A-register 820, and 16×4 B-register 801. The X-register 800 is divided into four 4×4 storage areas 802, 804, 806, and 808. The X-register 800 stores first sub-macro block data among a current macro block input from the dual buffer 702 (see FIG. 7) that stores prediction results. Namely, current macro block data, upon which a real filtering operation will be performed, are stored in the X-register 800. The upper 4×4 block 606 of data from the adjacent left macro block 604 is stored in the internal memory 712, and in the A-register 820. The B-register 801 is divided into four 4×4 storage areas 810, 812, 814, and 816, like the X-register 800. 16×4 upper adjacent macro block data 602 is stored in the B-register 801.

A horizontal component filtering operation of current sub-macro block data stored in the X-register 800 is performed using data stored in the A register 820. A vertical component filtering operation is formed using data stored in the B-register 801. In a filtering operation of a horizontal component among sub-macro block data stored in the X-register 800, by using data stored in the A-register 820 and data stored in a first area 802 at the leftmost side of the X-register 800, with respect to a vertical boundary between the A-register 820 and the X-register 800, filtering operations for four positions up and down every four pixels left and right are performed. When a filtering operation for the first area 802 is terminated, data stored in each register are shifted left in 4×4 blocks.

Figure 9:
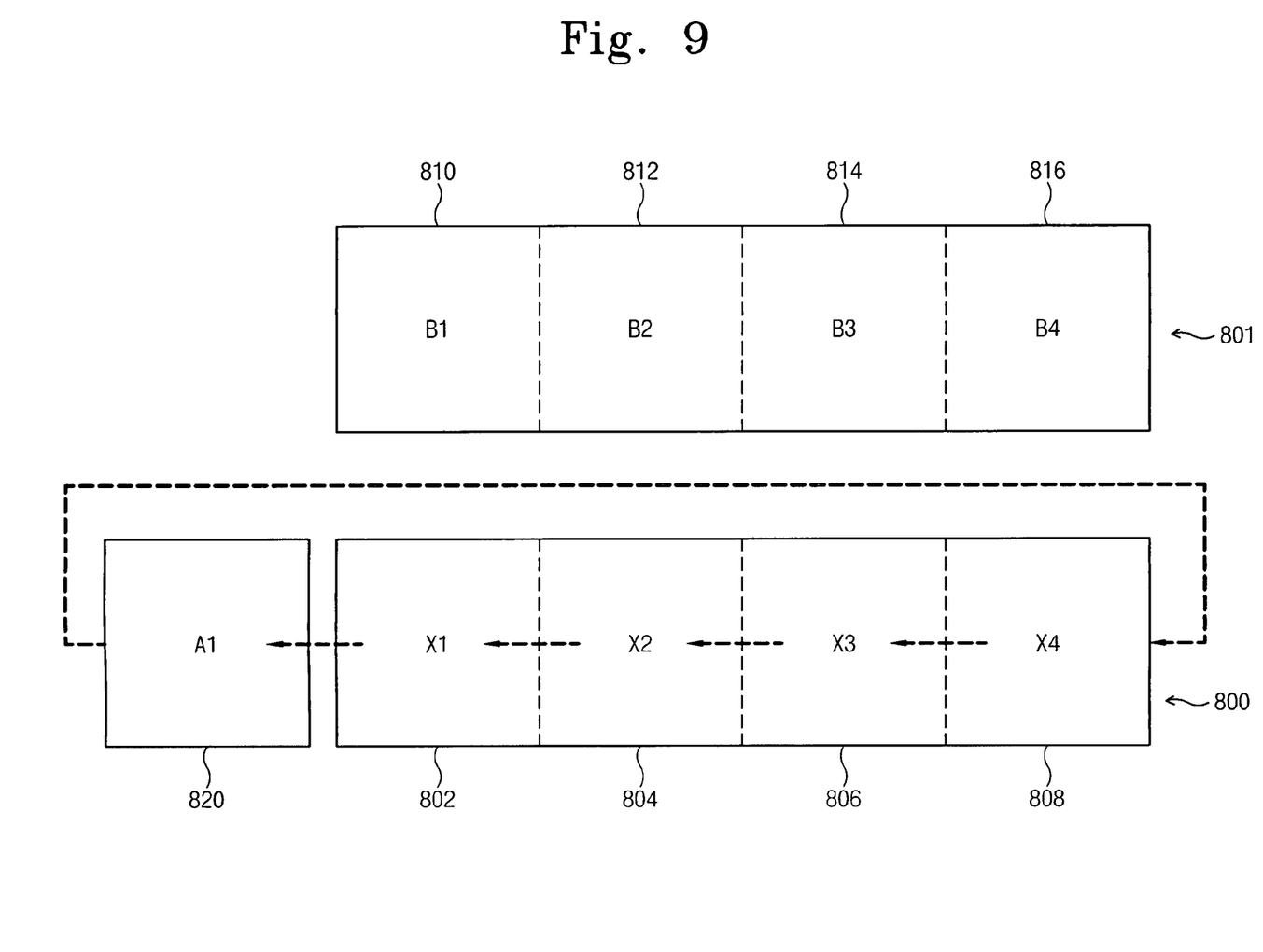
FIG. 9 is a view that illustrates a shift operation of a register array for a horizontal component filtering operation according to further embodiments of the present invention.

FIG. 9 is a view that illustrates a shift operation of a register array for a horizontal component filtering operation according to some embodiments of the present invention. As shown in FIG. 9, when the filtering operation for the first area 802 finishes, data X1 stored in the first area 802 of the X-register 800 are shifted and stored into the A-register 820, data X2 stored in the second area 804 are shifted and stored in the first area 802, and data X3 stored in the third area 806 are shifted and stored into the second area 804. Further, data X4 stored in the fourth area 808 are shifted and stored into the third area 806, and data A1 stored in the A-register 820 are shifted and stored into the fourth area 808. The aforementioned procedures (operation→shifting) repeat until filtering operations for all the data stored in the X-register 800 are complete. Filtering operations for the X-register 800 are complete when data A1 stored in the A-register 820 has shifted four times and is positioned at the first area 802 of the X-register 800. Shifting once more positions the data at their initial stored areas.

Thereafter, vertical component filtering operations for sub-macro block data stored in the X-register 800 are performed. This is carried out using data stored in the B-register 801. Because each of the X-register 800 and the B-register 801 have 4×4 blocks, with respect to one horizontal boundary, filtering operations for 16 positions every four pixels up and down are performed.

Through the aforementioned procedures, when vertical and horizontal filtering operations for one sub-macro block having a 16×4 size are complete, the X-register 800 is filled with data for a next sub-macro block, the data previously stored in the X-register 800 are shifted to the B-register 801, and 4×4 data to be stored in the A-register 820 are input from the internal memory 712. The first data stored in the A-register 820 and the B-register 801 are output to an external recipient. Such procedures for entire macro blocks can be continuously performed. That is, an input of new sub-macro block data, a shifting of a sub-macro block a filtering operation of which is terminated, and outputs of data stored in the A-register 820 and the B-register 801 can be simultaneously performed.

Figure 10:
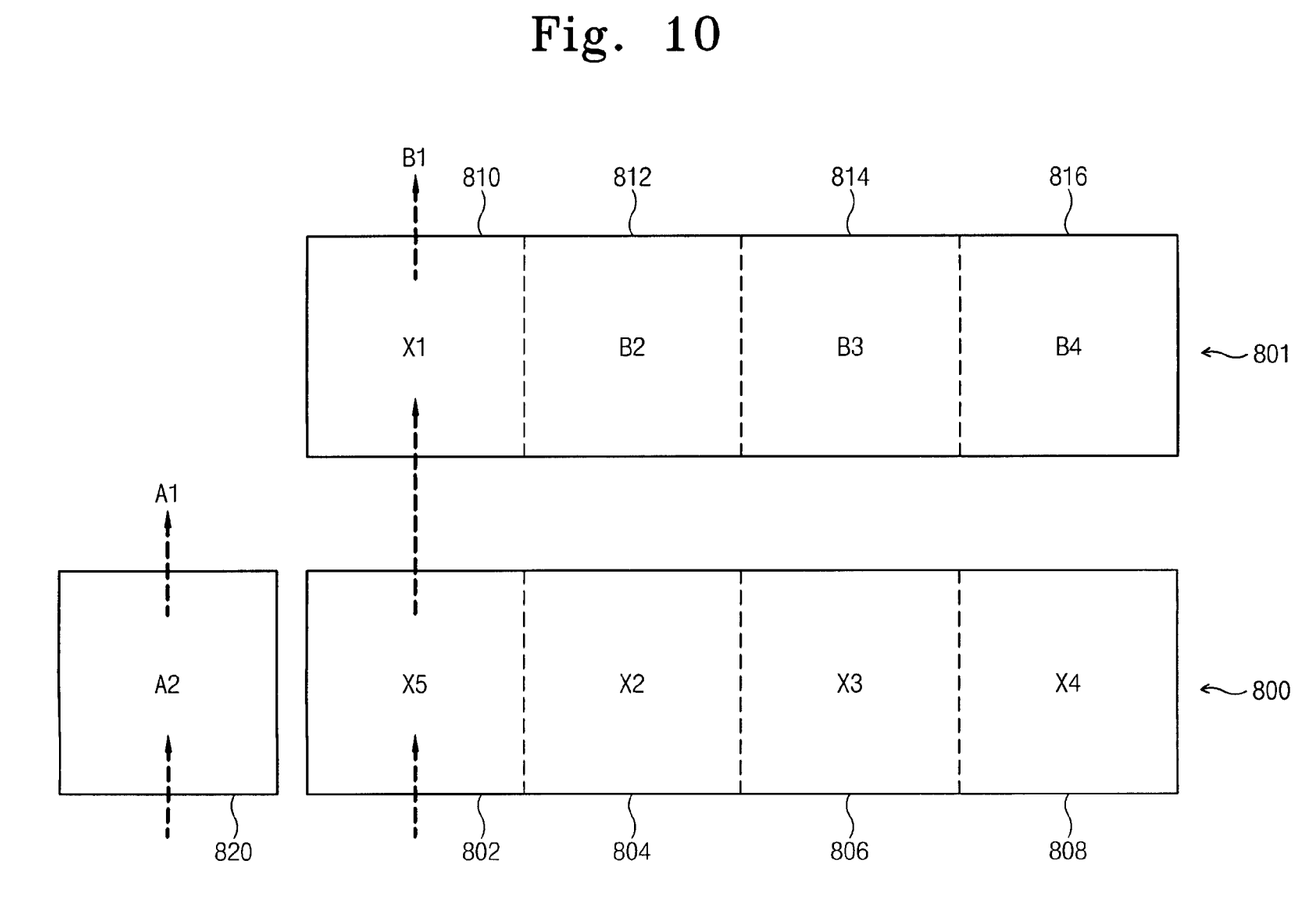
FIGS. 10 through 13 are views illustrating input and output operations of a register array according to some embodiments of the present invention.

FIGS. 10 through 13 illustrate exemplary operations of the register array of FIG. 8 according to some embodiments of the present invention. As shown in FIG. 10, when data X5 for the leftmost 4×4 area of the second sub-macro block is input to the first area 802 of the X-register 800 and next data A2 of the A macro block stored in the internal memory 712 is input to the A-register 820, data X1 stored in the first area 802 of the X-register 800 is shifted to the first area 810 of the B-register 801, data B1 stored in the first area 810 of the B-register 801 are output, and data A1 stored in the A-register 820 are output.

Figure 11:
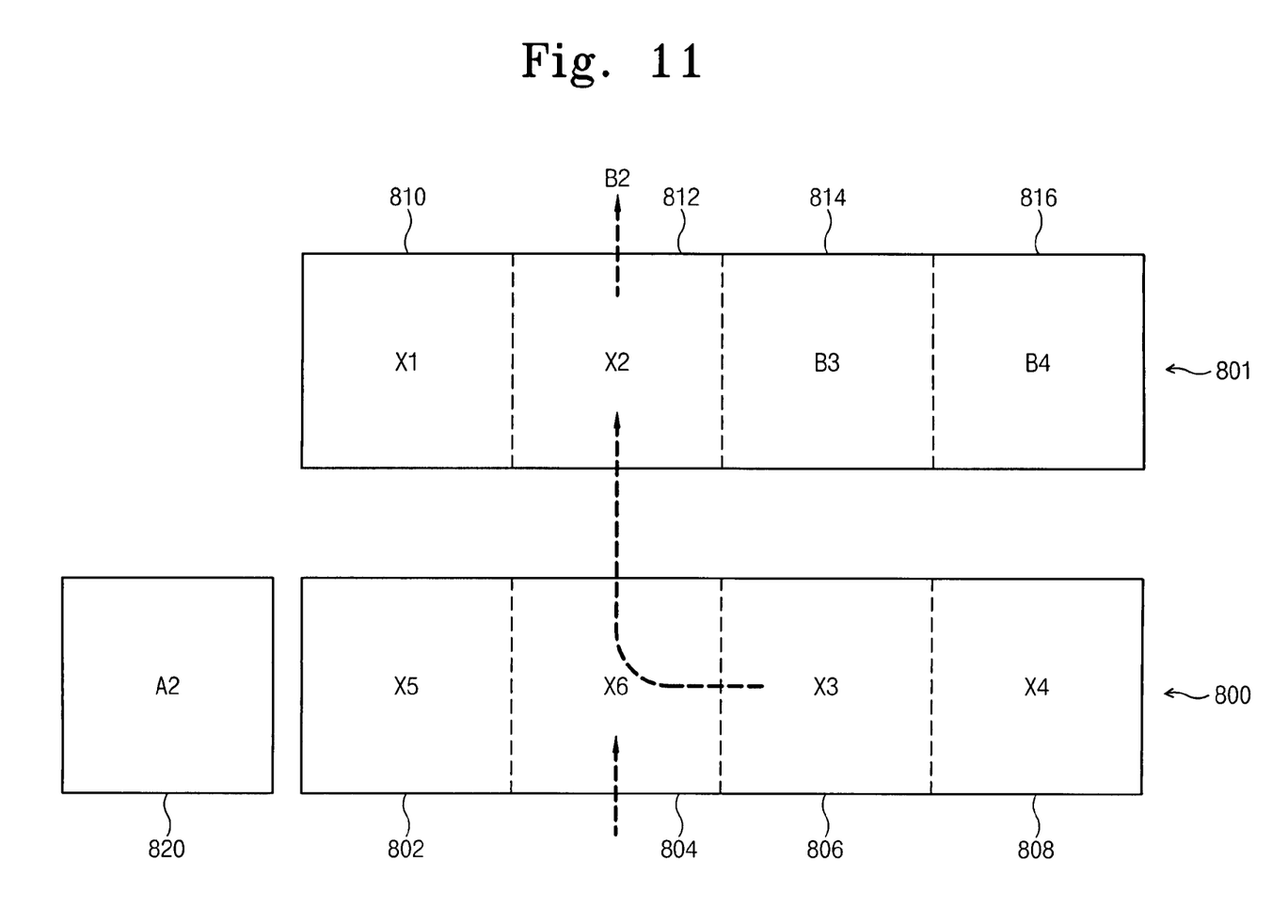

As shown in FIG. 11, when second area data X6 of the second sub-macro block is input to the second area 804 of the X-register 800, data X2 previously stored in the second area 804 of the X-register 800 is shifted to the second area 812 of the B-register 801, and data B2 stored in the second area 812 of the B-register 801 is output. Horizontal component filtering operations for data A2 stored in the A-register 820 and data X5 stored in the first area 802 of the X-register 800 are simultaneously carried out.

Figure 12:
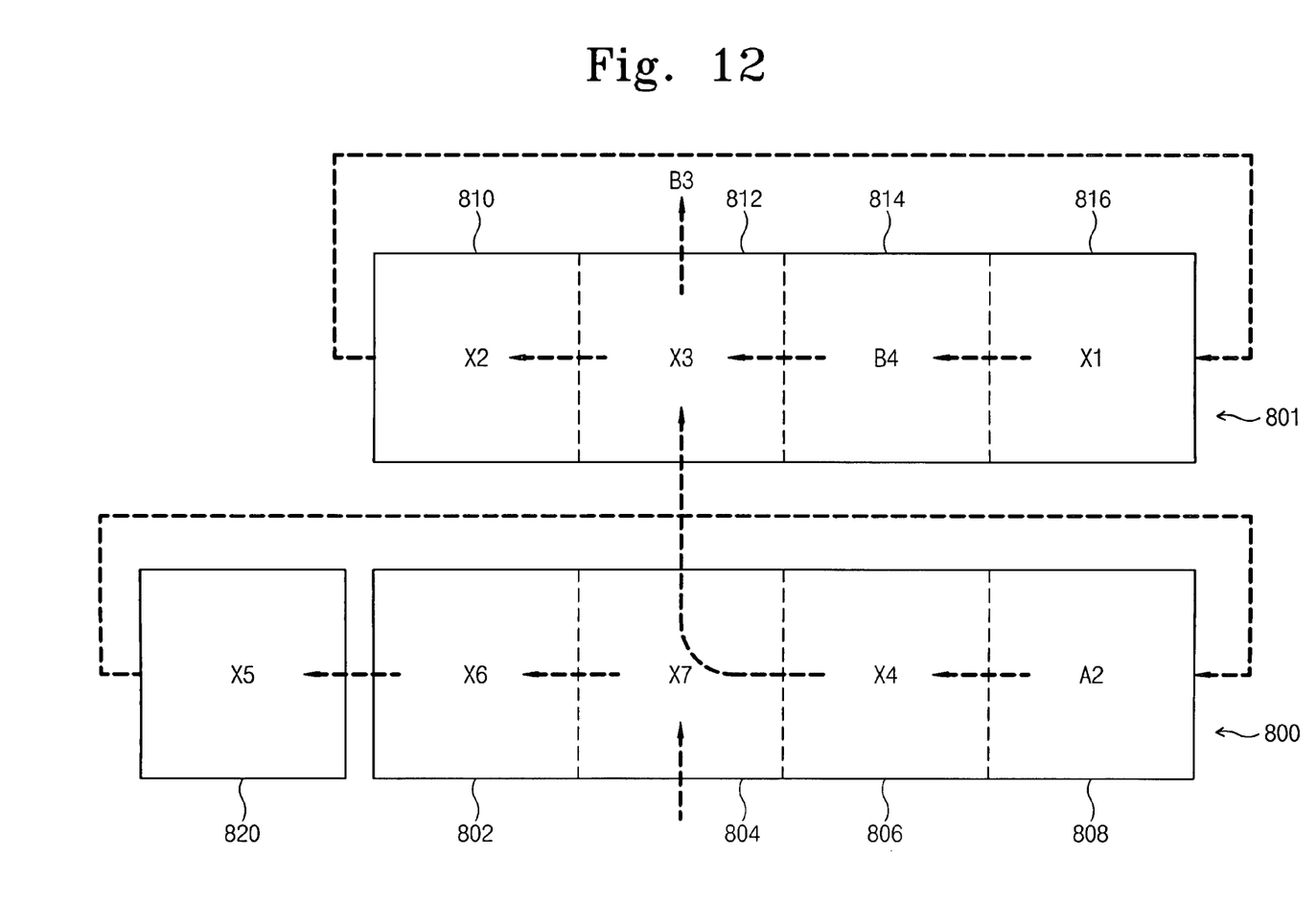

When the filtering operation for the first area 802 of the X-register 800 finishes, as shown in FIG. 12, data stored in respective areas of the A-register 820 and the X-register 800 are shifted in 4×4 blocks. When the horizontal component filtering operations on the data stored in the respective registers are terminated, horizontal component filtering operations for the data X6 stored in the first area 802 of the X-register 800 and the data X5 stored in the A-register 820 are performed. At the same time, third area data X7 of the second sub-macro block is input to the second area 804 of the X-register 800, and third area data X3 of the first sub-macro block stored in the second area 804 of the X-register 800 is shifted to the second area 812 of the B-register 801. Consequently, the third area data B3 of a B macro block stored in the second area 812 of the B-register 801 is output.

Figure 13:
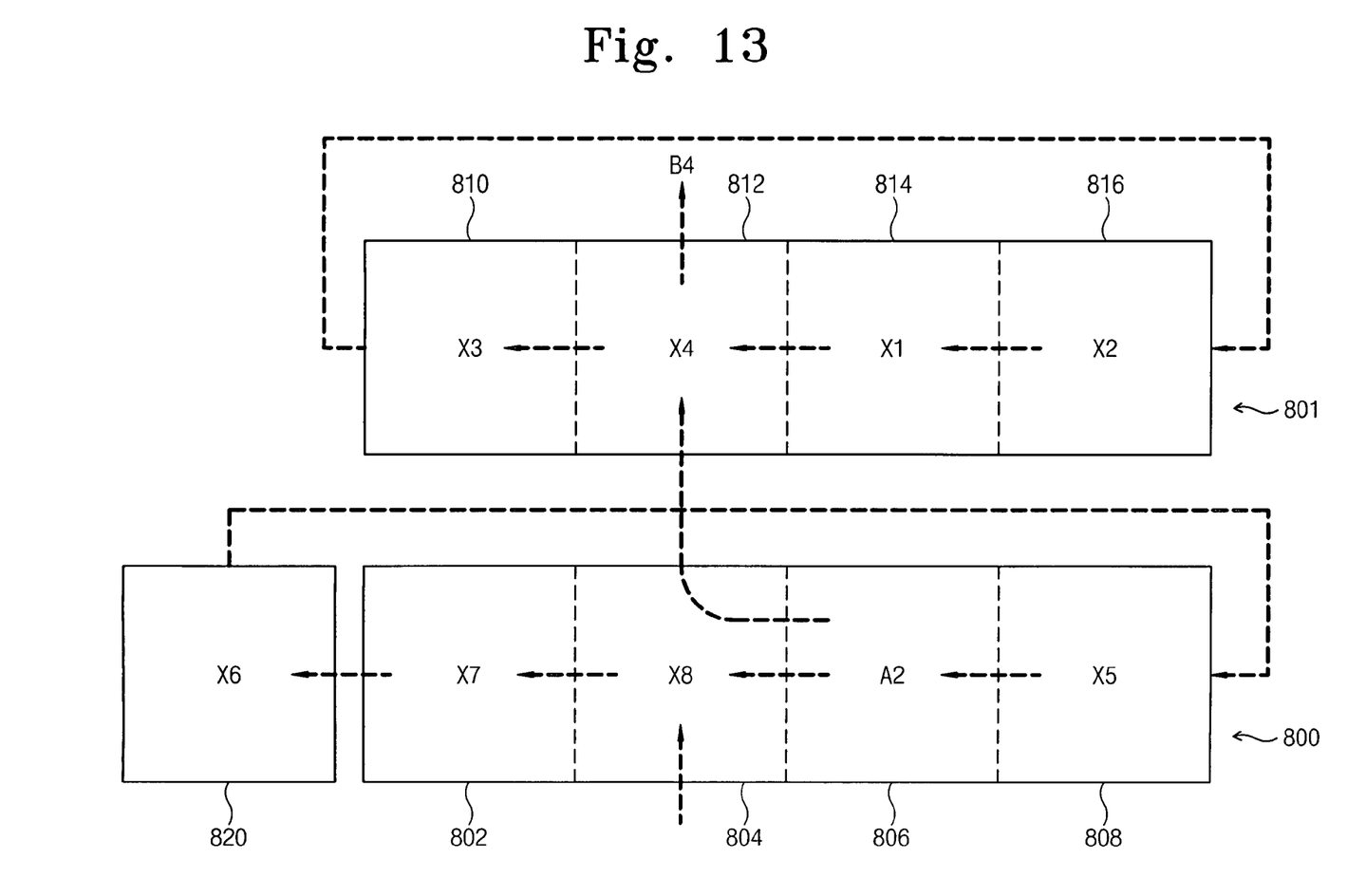

Through a repetition of the aforementioned procedures, as shown in FIG. 13, after the input of fourth area data X8 of the second sub-macro block is terminated, filtering operations for remaining horizontal components are subsequently carried out. After the horizontal component filtering operation is completed, when data are sequentially shifted and arranged at respective registers, a vertical component filtering operation for data stored in the X-register 800 is performed.

By repeating the aforementioned procedure for a new sub-macro block, all of filtering operations for one macro block may be performed. On the other hand, as described above, when the first area 802 positioned at the leftmost side of the X-register 800 are only filled with data, the data are shifted and inputted from up to down through the first area 802, residual data are inputted through the second area 804 of the X-register 800.

When a filtering operation for one macro block is performed using the register array of the present invention, it may take 4 cycles to input data for a first A-register 820 and the first area of the X-register 800, 8 cycles to perform a horizontal component filtering operation for the data (the time required to perform a filtering operation every position is two cycles), and 36 cycles to carry out a horizontal component filtering operation for one sub-macro block. In the vertical component filtering operation, in order to return arrangements of respective areas to original positions, one cycle may be used. Accordingly, a total of 37 cycles may be used to perform a horizontal component filtering operation for one sub-macro block. Furthermore, because the vertical component filtering operations for 16 positions are performed, a total of 32 cycles may be used. As a result, the time required to complete a filtering operation for one macro block may be 306(=14+4×(37+32)) cycles, including 14 overhead cycles. The time to finish a chroma component filtering operation may be 153(=306×0.5) cycles. Thus, it may take a total of 459 cycles to complete a deblocking filtering operation for one macro block.

As mentioned above, a register array according to some embodiments of the present invention allows a deblocking filter of a small area to be designed. Further, a data input, a filtering operation, a data shift, and a data output can be simultaneously performed, which can allow the filtering operation to be performed at high speed.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A register array of a deblocking filter, the register array comprising:
   a first register configured to store an amount of image data corresponding to a sub-macro block of a macro block to be filtered;
   a second register configured to store an amount of image data corresponding to a portion of a sub-macro block adjacent a first edge of the macro block to be filtered,
   a third register configured to store an amount of image data corresponding to an entire sub-macro block adjacent a second edge of the macro block to be filtered; and wherein the first, second and third registers are further configured to support sequential horizontal and vertical component filtering of portions of sub-macro blocks of the macro block to be filtered by sequentially shifting portions of the sub-macro blocks through the first, second and third registers.

2. The register array of claim 1, wherein the first and second registers are configured to support sequential horizontal component filtering operations on portions of the sub-macro blocks by circularly shifting the portions of the sub-macro blocks through the first and second registers.

3. The register array of claim 2, wherein the sequential horizontal component filtering operations comprise sequential filtering operations on combinations of data in the second register and data in a portion of the first register.

4. The register array of claim 1, wherein the first and third registers are configured to support concurrent vertical component filtering operations on multiple ones of the portions of the sub-macro blocks.

5. The register array of claim 1, wherein the first, second and third registers are configured to receive image data from an internal memory of the deblocking filter.

6. The register array of claim 1, wherein the first and third registers are 16×4 registers, and wherein the second register is a 4×4 register.

7. The register array of claim 6, wherein the sub-macro blocks are 16×4 sub-macro blocks, and wherein the portions of the sub-macro blocks are 4×4 portions of the 16×4 sub-macro blocks.

8. A deblocking filtering method comprising:
providing a first register configured to store an amount of image data corresponding to a sub-macro block of a macro block to be filtered, a second register configured to store an amount of image data corresponding to a portion of a sub-macro block adjacent a second edge of the macro block to be filtered, and a third register configured to store an amount of image data corresponding to an entire sub-macro block adjacent a first edge of the macro block to be filtered; and
sequentially horizontal and vertical component filtering portions of sub-macro blocks of the macro block to be filtered by sequentially shifting portions of the sub-macro blocks through the first, second and third registers.

9. The method of claim 8, wherein sequentially horizontal and vertical component filtering portions of sub-macro blocks of the macro block to be filtered by sequentially shifting portions of the sub-macro blocks through the first, second and third registers comprises:
sequentially horizontal component filtering portions of the sub-macro blocks by circularly shifting the portions of the sub-macro blocks through the first and second registers; and
concurrently vertical component filtering the horizontal component filtered portions of the sub-macro blocks using the first and third registers.

10. The method of claim 9, wherein sequentially horizontal component filtering comprises sequentially filtering combinations of data in the third register and data in a portion of the first register.

11. The method of claim 9, wherein the first and third registers are 16×4 registers, and wherein the second register is a 4×4 register.

12. The method of claim 11, wherein the sub-macro blocks are 16×4 sub-macro blocks, and wherein the portions of the sub-macro blocks are 4×4 portions of the 16×4 sub-macro blocks.

13. A deblocking filtering, method, the method comprising:
dividing a macro block of image data into a plurality of equal-sized sub-macro blocks; and
performing the following operations on each of the sub-macro blocks in sequence:
performing a horizontal component filtering operation on the sub-macro block; and then
performing, a vertical component filtering operation on the horizontal component filtered sub-macro block,
wherein the plurality of equal-sized sub-macro blocks comprises four 16×4 sub-macro blocks, and wherein performing the following operations on each of the sub-macro blocks in sequence comprises:
performing a horizontal component filtering operation on a first sub-macro block;
performing a vertical component filtering operation on the horizontal component filtered first sub-macro block;
performing a horizontal component filtering operation on a second sub-macro block;
performing a vertical component filtering operation on the horizontal component filtered second sub-macro block;
performing a horizontal component filtering operation on a third sub-macro block;
performing a vertical component filtering operation on the horizontal component filtered third sub-macro block;
performing a horizontal component filtering operation on a fourth sub-macro block; and
performing a vertical component filtering operation on the horizontal component filtered fourth sub-macro block.

14. The method of claim 13, wherein the first, second, third, and fourth sub-macro blocks are positioned in the order from an uppermost edge of the macro block to a lowermost edge of the macro block.

* * * * *